April 21, 1959 W. T. WINSTEAD 2,882,572
FAST-ACTING TUBING CLAMP
Filed Sept. 7, 1955

INVENTOR.
WADE T. WINSTEAD
BY Edward W. Lang
ATTORNEY

United States Patent Office 2,882,572
Patented Apr. 21, 1959

2,882,572

FAST-ACTING TUBING CLAMP

Wade T. Winstead, McHenry, Ill., assignor to The Pure Oil Company, Chicago, Ill., a corporation of Ohio Application September 7, 1955, Serial No. 532,911

2 Claims. (Cl. 24—19)

This invention relates to a device for and method of clamping deformable tubing to an adjacent member.

More particularly, this invention is concerned with a fast-acting clamp for removably coupling flexible tubing to a rigid tubular member, and a method of utilizing said clamp.

In general, tubing clamps and similar devices are usually constructed in a manner that involves a preformed hoop member. One of the disadvantages of such appliances is the lack of adjustibility of the appliance to a wide range of sizes. Also, the device may be so constructed that considerable time is consumed in the clamping procedure. A large number of existing types of clamps feature wrapping, tieing or locking of a separate wire element around the tubing in a more or less permanent manner. The removal of the clamp or wire so affixed involves cutting the wire or otherwise rendering it unavailable for easy reuse.

This invention covers a clamping device for holding in a firm manner flexible tubing onto an adjacent member, such as a relatively non-resilient or rigid rod or tube made of glass, metal, wood or the like, and the method of applying the instant device, which is simple and very fast. The construction is such that the device may be easily assembled with a minimum of cost, time and material. Moreover, the fast-acting clamp of this invention lends itself to use with varying sizes of tubing and features as one element a strand of wire, cord or the like, rather than a pre-formed hoop of pre-determined and limited size, such as the usual clamp device requires. Removal of the clamp of this invention is simple and every portion of the device is re-usable.

Accordingly, it is an object of this invention to provide a fast-acting tubing clamp, and a method of clamping.

It is also an object of this invention to provide a clamp relatively easily adjusted to accommodate tubing of widely varying sizes.

It is a further object of this invention to provide a simple, easily applied and easily removable tubing clamp of relatively low cost.

It is a further object to provide a method for quickly and temporarily clamping a flexible tube to a rigid member.

It is yet another object of this invention to provide a fast-acting clamp for compressing flexible tubing tightly around an adjacent object, said tubing clamp featuring a quick-acting cam-lock, and utilizing wire as the constricting means.

A further object of the invention is to provide a quick method for attaching a clamp so as to form a leak-proof union between flexible and rigid tubing.

This invention possesses other objects and features of advantage which will be apparent from the following detailed description and accompanying drawings. It is to be understood the invention is not to be limited to the specific embodiments hereinafter shown and described but is also to include other embodiments as are within the scope of the appended claims.

This invention is best described by reference to the accompanying drawings, of which—

Figure 1:
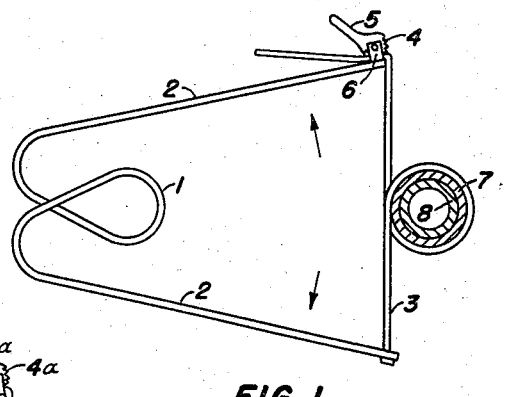
Figure 1 is a side elevational view of the clamp of my invention mounted on a pair of telescoped tubular members, shown in cross-section.

Describing my invention in more detail, Figure 1 shows a simplified embodiment of the tubing clamp of this invention comprising in combination a spring member preformed in the shape of a loop 1 from spring steel, which may be flat or circular in cross-section, and having laterally extending arms in the same plane. Both arms extend in the same direction. In place of spring steel another flexible substance such as resilient plastic, rubber or any material which has the ability to quickly recover its shape upon release of distorting forces, may be utilized. The spring member may be of any width, varying from a narrow gauge or wire to a wide gauge or strap-like arrangement. The loop is formed so that the ends of lateral arms 2 tend to diverge.

To the free end of one arm 2 is attached one end of a string, wire, strap, cord or equivalent easily movable line member 3. The end of this arm may be formed with a hole or notch to receive the strap and hold it in place by tying or otherwise fastening while to the free end of the remaining arm 2 is attached a cam-lock for adjusting the length of member 3 between the two arms 2. After being attached to the free end of one arm 2, line 3 is passed around the periphery of compressible tube 7 and in contact with the surface thereof. Arms 2 are compressed toward each other manually while adjusting line 3, so as to increase the tension on line 3 when manual pressure on the arms is released and pull it tightly against the outer periphery of tubing 7. Line member 3 is then passed between the wheel-like ratchet 4 of the cam-lock and the adjacent surface of arm 2 holding the cam-lock and is held in position against said surface by the compressive action exerted by the ratchet cam-lock, after it is moved into engaging position by means of handle 5. The cam-lock is pivotably connected to arm 2 by means of depending legs 6. Tubing 7 is compressed thereby and firmly held against tubing 8 which is in contact with tubing 7 along its inner surface.

In operation, the clamp of Figure 1 is adjusted for a proper loop by clamping the free end of wire 3 at the proper point with the cam-lock. The ends 2 are then compressed together to expand the loop so formed and this loop is passed over the end of tubing 7. Tubing 7 is then fitted over tubing 8 and the compressive force exerted on arms 2 is released so that the natural spring action of loop 1 tends to force arms 2 outward from each other and thus tighten the loop in wire 3 firmly about the periphery of tubing 7; or, if the tubing is already assembled, the line 3 may be looped about the tubing and then engaged in the compressed clamp.

Figure 2:
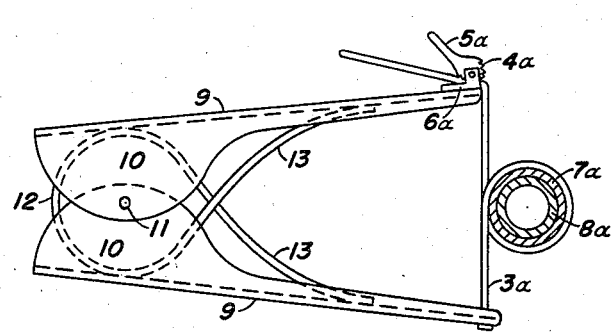
Figure 2 is a similar view of Figure 1 showing another embodiment of the clamp of my invention in its engaged position.

Figure 2 shows a modified embodiment of the instant invention and comprises in combination a frame having laterally extending legs 9, and ear portions 10 formed integrally with legs 9 and pivotably hinged or linked together through a hinge point 11. A coil spring is placed with its loop 12 around point 11 and with its arms 13 crossed over one another and contacting the inner surface of legs 9 so as to exert a force thereon tending to force the ends of legs 9 apart and away from one another. The frame may be prepared from any suitable material, such as a sheet metal, for example, sheet steel, brass or aluminum. Alternatively, the frame may be prepared from a non-metal, such as wood, plastic, hardened rubber or the like. The coil spring may be prepared from any suitable spring-like material such as spring steel, rubber, resilient plastic or any other material which has good recovery upon release from deformation. To the free end of one leg 9 is attached line 3a, which may be composed of a metal, or non-metal such as rubber, cotton, flax or other fiber prepared in string or cord form, that is, as an elongated flexible strip. The free end of line 3a passes through a hole or notch (not shown) in the end of the other arm 9 and then between the wheel-type ratchet 4a of the cam-lock attached to the corresponding end of the remaining leg 9 and the adjacent surface of leg 9 as in Figure 1. The cam-lock wheel 4a is moved by handle 5a so that it contacts wire 3a and presses the latter tightly against the surface of leg 9, effectively locking 3a and controlling its length between legs 9. The cam-lock is initially attached to leg 9 by depending legs 6a. The manner of operation of the clamp of Figure 2 is identical with that of the clamp of Figure 1, the loop being formed from 3a and then being passed over one end of compressible tubing 7a before the latter is fitted over tubing 8a, and while compressive force is exerted on legs 9 to increase the size of the loop in line 3a. On release of the compressive force exerted on leg 9, arms 13 force legs 9 apart and tighten loop 3a closely around the periphery of tubing 7a so that it tightly clings to tubing 8a present along its inner surface.

Figure 3:
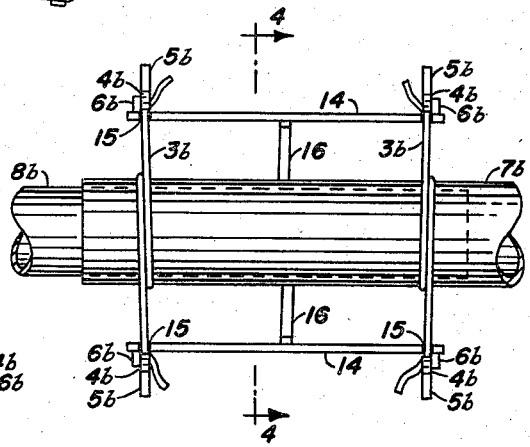
Figure 3 is a front elevational view of another embodiment of my invention, incorporating a double clamp arragement with the wire element in position around a pair of telescoped tubular members.
Figure 4:
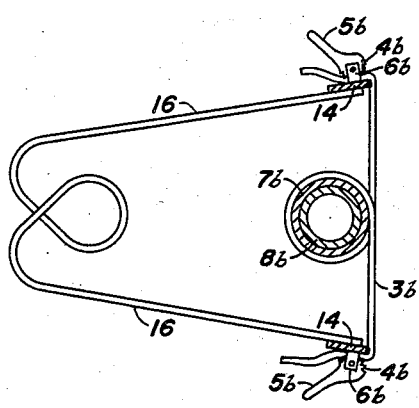
Figure 4 is a cross-sectional view of the device of Figure 3, taken along the indicated cross-sectional line 4—4 of Figure 3.

Figures 3 and 4 represent another modification of the device of the instant invention and comprise a coil spring having laterally extending arms 1b, the free end portion of each arm being coupled to and at right angles with cross members 14. To the ends of members 14 are attached in vertical spaced relation thereto cam-locks having wheel-type ratchets 4b, handles 5b and depending legs 6b connecting the cam-locks to the adjacent surface of 14. Thus, four cam-locks are present, one extending from the upper surface of each end of upper member 14 and one depending from the lower surface of each end of the lower member 14. Through the cam-locks are passed lines 3b, so that in each case the line 3b is clamped to the adjoining surface of 14 by the compressive action of ratchet wheel 4b turned to the suitable position by means of handle 5b. The lines 3b lie in notch 15 (Figure 3) formed near the ends of cross members 14. The length of lines 3b can be adjusted to suit the dimension of tubing 7b shown telescoped around tubing 8b. The loop in line 3b, as in the device of Figures 1 and 2, may be introduced around tubing 7b either by adjusting the ends of lines 3b to suitable size, compressing members 14 towards each other and expanding the loop, fitting over one end of tubing 7b before tubing 8b is introduced into the same end of tubing 7b and then releasing the compressive force on member 14, or by attaching one end of line 3b, looping the free portion of line 3b around tubing 7b, which either has or has not had tubing 8b present therein, then compressing members 14 towards each other while fitting the free end of line 3b between the space of ratchet 4b and the adjoining surface of member 14, clamping 3b to 14 with 4b by means of 5b, in such a manner that when the compressive action on 14 is released the loop so formed will tightly compress 7b to 8b. Member 14 of Figure 3 may be prepared from any suitable material, of substantially rigid character, such as wood, metal, plastic or the like. The coil spring may be prepared from material as set forth in the discussion of Figures 1 and 2.

In the present invention, equivalent apparatus may be substituted for the cam-locks for the purpose of clamping and holding at least one end of the line member of the instant tubing clamp. Thus, spring clamps, pegs for winding the line thereabout and other devices may be employed, to fix the ends of the line 3, 3a, 3b and the like in position at the ends of the coil spring arms. They may be prepared from any suitable material, such as steel or a non-metal such as hardened rubber, plastic, wood or the like. The design of the cam-lock or equivalent apparatus is unimportant as long as it provides a quick means for releasably holding an end of the line member. Notches, holes or slots for catching the line member and holding it fast to the end of the clamp are also suitable.

The loop formed in the line member between the free arm ends of the coil spring may extend outwardly from or inwardly towards the arms.

For practical purposes, the instant clamp is preferably fabricated using spring steel wire for the coil spring portion, soft wire for the line and ordinary sheet steel for the cam-lock or its equivalent. In this manner the instant device is of optimum strength and lowest possible cost.

Various modifications other than those appearing in the figures are also contemplated, such as the use of a continuous sheet of spring steel as the coil spring portion bent in an L shape and with no loop present. A plurality of cam-locks may be employed along the free ends of the spring arms to engage and hold a plurality of line members. Various other modifications of this invention as are within the purview of one skilled in the art are contemplated as a portion of this invention.

The device of this invention is not to be limited to the clamping of tubes but may also be used in analogous situations, such as clamping rubber, wood or other objects of square, oblong or other shapes together.

I claim and particularly point out as my invention:

1. A clamping device for securing a soft tubular member to a rigid member inserted therein and including in combination, a pair of clamping wires each having an initial undeformed condition and adapted to be looped completely around the tubular member in laterally spaced relation, a spring clamp for tightening said clamping wires on the tubular member and including a pair of arms connected together at one end and having their outer ends movable relative to each other, spring means connected to said arms and urging said outer ends thereof toward an opened position, means for securing one end of each of said clamping wires in laterally spaced relation on the outer end of one of said arms, means for securing the other ends of said clamping wires adjustably in laterally spaced relation on the outer end of the other of said arms so that the length of each of said clamping wires may be varied in accordance with the size of the tubular member to be clamped and each of said clamping wires being operable to prevent twisting movement of said clamping device relative to the other clamping wire.

2. A clamping device for securing a soft tubular member to a rigid member inserted therein and including in combination, a pair of clamping wires each having an initial undeformed condition and adapted to be looped completely around the tubular member in laterally spaced relation, a spring clamp for tightening said clamping wires on the tubular member and including a pair of arms connected together at one end and having their outer ends movable relative to each other, a cross bar member supported on the outer end of each of said arms and extending at right angles therefrom, a coil spring connected to said arms and urging said outer ends thereof to an opened position, means for securing one end of each of said clamping wires in laterally spaced relation on the cross bar member on the outer end of one of said arms, a pair of clamping cam members for securing the other ends of said clamping wires adjustably in laterally spaced relation on the cross bar member on the outer end of the other of said arms so that the length of each of said clamping wires may be varied in accordance with the size of the tubular member to be clamped, and each of said clamping wires being operable to prevent twisting movement of said clamping device relative to the other clamping wire.

References Cited in the file of this patent

UNITED STATES PATENTS

| | | |
|---|---|---|
| 1,910,116 | Malleville | May 23, 1933 |
| 2,238,386 | Frank | Apr. 15, 1941 |
| 2,284,314 | Wetzler | May 26, 1942 |
| 2,393,842 | Townsley | Jan. 29, 1946 |

FOREIGN PATENTS

| | | |
|---|---|---|
| 173,134 | Switzerland | Feb. 1, 1935 |